(12) United States Patent
Hanks et al.

(10) Patent No.: US 7,440,574 B2
(45) Date of Patent: Oct. 21, 2008

(54) CONTENT ENCRYPTION USING PROGRAMMABLE HARDWARE

(75) Inventors: Darwin Mitchel Hanks, Fort Collins, CO (US); Alexandra Delorme, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 863 days.

(21) Appl. No.: 10/460,481

(22) Filed: Jun. 11, 2003

(65) Prior Publication Data

US 2005/0021961 A1 Jan. 27, 2005

(51) Int. Cl.
*H04L 9/14* (2006.01)
(52) U.S. Cl. .................. 380/281; 380/284; 713/193
(58) Field of Classification Search ................ 380/281, 380/284; 713/193
See application file for complete search history.

(56) References Cited

U.S. PATENT DOCUMENTS

| | | | |
|---|---|---|---|
| 6,061,451 A | 5/2000 | Muratani et al. | |
| 6,161,179 A | 12/2000 | Seidel | |
| 6,275,588 B1 | 8/2001 | Videcrantz et al. | |
| 6,289,455 B1 * | 9/2001 | Kocher et al. ............... | 713/194 |
| 6,363,357 B1 | 3/2002 | Rosenberg et al. | |
| 6,381,732 B1 | 4/2002 | Burnham et al. | |
| 6,748,537 B2 * | 6/2004 | Hughes ...................... | 713/193 |
| 2002/0099663 A1 * | 7/2002 | Yoshino et al. .............. | 705/65 |
| 2003/0041221 A1 | 2/2003 | Okada ........................ | 711/164 |
| 2005/0120232 A1 * | 6/2005 | Hori et al. .................. | 713/193 |

FOREIGN PATENT DOCUMENTS

| | | |
|---|---|---|
| EP | 0844550 | 6/1999 |
| EP | 1335266 A1 | 8/2003 |
| GB | 2276471 A | 9/1994 |
| JP | 10-207362 | 8/1998 |
| JP | 2001-136160 | 5/2001 |
| WO | WO 00/44119 A1 | 7/2000 |

OTHER PUBLICATIONS

Fumitada Takahashi, et al., Nikkei Electronics Asia: May 1999—Special Report,"Music Over Internet Set to Explode", pp. 1-7.
Maurice Maes, et al., IEEE Signal Processing Magazine, Sep. 2000, "Digital Watermarking for DVD Video Copy Protection", pp. 1-10.
John Villasenor, et al., Scientific American Jun. 1997, "Configurable Computing", pp. 66-71.
Darwin Mitchel Hanks, New Patent Application, "Method and Apparatus for Playing Content", 16 pages of specification, claims and abstract, and 5 sheets of drawings.

* cited by examiner

*Primary Examiner*—Gilberto Barron, Jr.
*Assistant Examiner*—Devin Almeida (57) ABSTRACT

Methods and apparatus are disclosed for a content encryption scheme using programmable hardware. In one embodiment, a content request is transmitted to a content provider. In response to the content request, a session key is received and programmable hardware is configured using the session key to produce a first configuration. An identification key is generated and the first configuration of the programmable hardware is used to encrypt the identification key. The encrypted identification key is transmitted to the content provider. Encrypted content containing the identification key is then received.

27 Claims, 10 Drawing Sheets

CONTENT ENCRYPTION USING PROGRAMMABLE HARDWARE

BACKGROUND OF THE INVENTION

In the emerging Internet enabled world of digital asset commerce, the ease with which assets may be transferred enables many new business possibilities. Unfortunately, this ease of transfer also exposes digital assets to widespread illegal copying and distribution. Content that is in digital form can be copied without degradation. As a result, distributors and artists lose potential sales to customers who might otherwise purchase content, but instead obtain it illegally.

SUMMARY OF THE INVENTION

Methods and Apparatus are disclosed for content encryption using programmable hardware. In one embodiment, a content request is transmitted to a content provider. A session key is received in response to the content request. The session key is used to configure programmable hardware with a first configuration. An identification key is generated and the first configuration of the programmable hardware is used to encrypt the identification key. The encrypted identification key is transmitted to the content provider. Encrypted content containing the identification key is then received.

In another embodiment, after a content request is received from a content customer, a session key is sent to the content customer. In response to sending the session key, an encrypted identification key is received. Programmable hardware is configured and is used to decrypt the encrypted identification key. The programmable hardware is then configured with a second configuration and is used to generate encrypted content containing the identification key from content associated with the content request.

BRIEF DESCRIPTION OF THE DRAWINGS

Illustrative embodiments of the invention are illustrated in the drawings in which.

DETAILED DESCRIPTION

Figure 1:
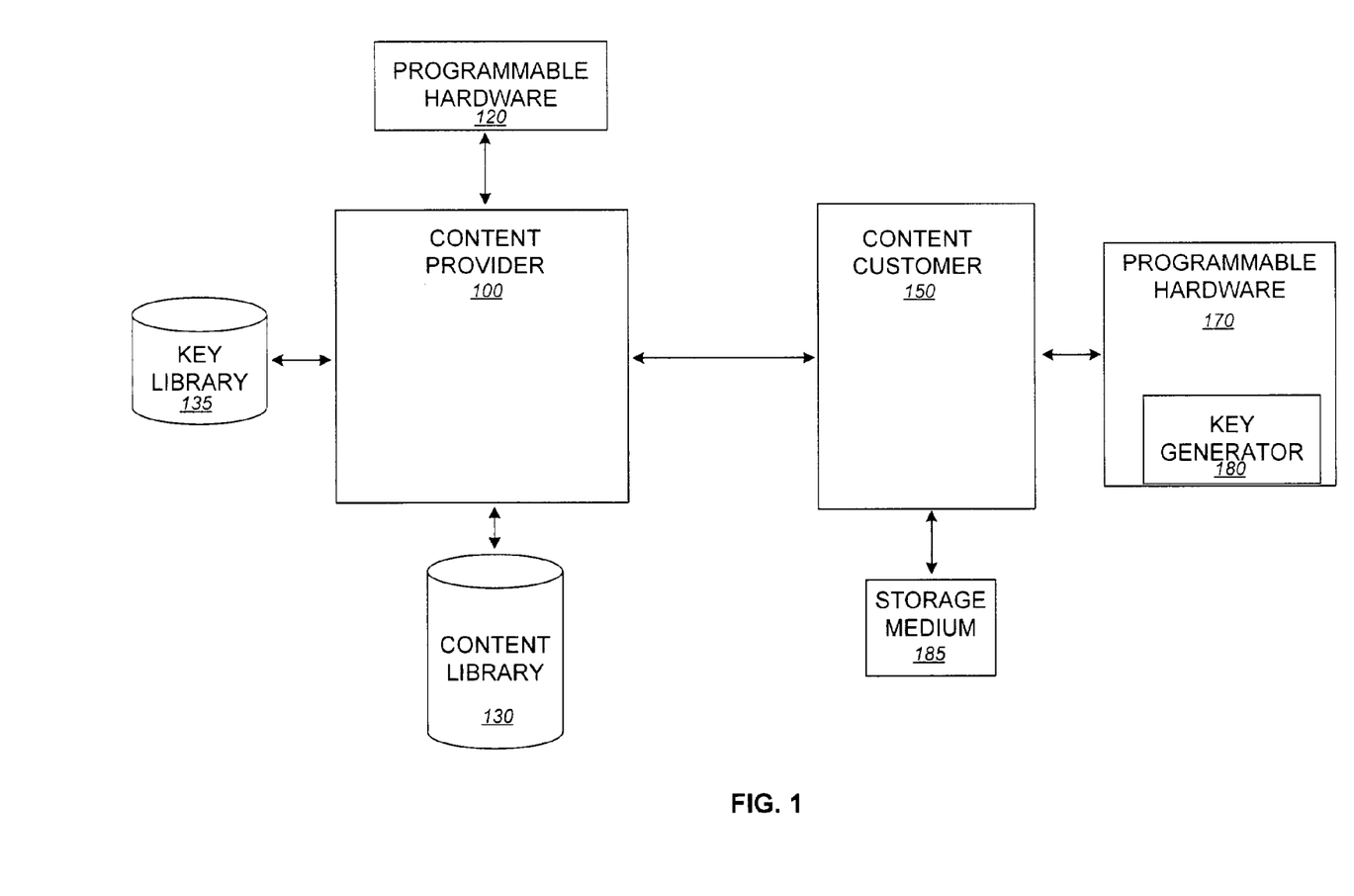
FIG. 1 is a block diagram showing an exemplary configuration of a content provider and a content customer.

An exemplary configuration containing a content provider 100 that provides content to a content customer 150 is shown in FIG. 1. Content provider 100 is communicatively coupled to content customer 150. Content provider 100 may be a computer on a network that provides content to a content customer 150. For example, content provider may be a server on the World Wide Web that provides content, such as digital movies, audio files, software programs, or text files, to a client customer 150.

Content provider 100 may also be a source device, such as a tape drive, a disk drive, a compact disk (CD) drive, a CD player, a digital versatile disk (DVD) player, or other device that provides content for copying, playback, or other type of content access. Content customer 150 may be a client computer or a destination device, such as a tape drive, a disk drive, a writeable CD drive, a recordable DVD drive, a computer monitor, a television, a stereo, or other device that is a destination for a copy, playback, storage, or other type of content access.

Content provider 100 may be communicatively coupled to a content library 130. Content library 130 may be a computer file or a database containing one or more audio, video, text, or other types of files that correspond to content that can be requested by the content customer 150. It should be appreciated that other embodiments may not include a content library. Instead, the content to be provided may be stored in a buffer or may be data stored on a disk, tape, CD, DVD, or other type of storage medium.

Content provider 100 is also communicatively coupled to a key library 135. The key library 135 contains one or more keys to be used as part of an encryption process described later in this application. Other embodiments may not include a key library 135. Instead, the keys may be stored with the content to be provided, another location, may be provided by an alternate source or be generated "on the fly".

Programmable hardware 120 is communicatively coupled to the content provider 100. Programmable hardware 170 is also communicatively coupled to content customer 150. The programmable hardware 120, 170 is a device, such as a field programmable gate array (FPGA), a programmable logic device (PLD), or a type of microprocessor, that can be configured with a variety of different configurations. The programmable device 120, 170 manipulates data differently according to its current configuration. Although reference will be made throughout this application to functions performed by programmable hardware, it should be appreciated that in alternate embodiments these functions may be performed by configurable software.

The content provider 100 may use programmable hardware 120 to encrypt content. Content customer 150 may use programmable hardware 170 to decrypt content. Content provider 100 and content customer 150 can configure and input data to their respective programmable devices. However, either or both of the parties may not know the configuration of the programmable device generated by a particular configuration pattern and, as a result, may be ignorant of the manner in which the programmable device manipulates data when configured with a particular pattern. Using programmable hardware to encrypt content may make it difficult for interceptors to access encrypted content because programmable hardware may provide an almost unlimited number of algorithm possibilities depending upon its configuration.

Programmable hardware 170 includes a key generator 180. In one embodiment, key generator 180 may be a random number generator. Key generator 180 may be used to generate an identification key used in an encryption process. It should be appreciated that in alternate embodiments, key generator 180 may be a separate component communicatively coupled to programmable hardware 170.

A storage medium 185 may be used to store content received from the content provider. The storage medium 185 may be a disk, CD, tape, DVD, or other type of device to store content. It should be appreciated that some embodiments may not include the storage medium 185. For example, if content customer is a playback device, content may be sent directly to a component to play the content to a user.

In the configuration described above, different components were described as being communicatively coupled to other components. A communicative coupling is a coupling that allows communication between the components. This may be by means of a bus, cable, network, wireless mechanism, or other mechanism that allows communication between the components.

Figure 2:
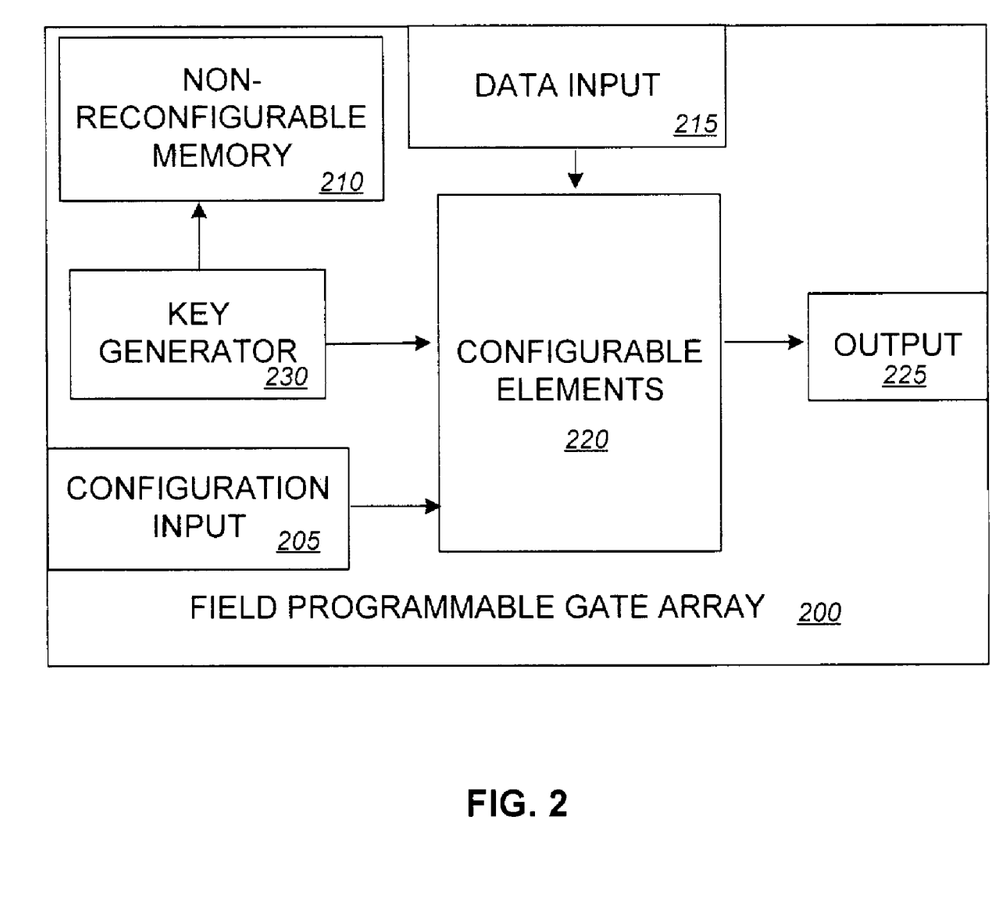
FIG. 2 illustrates an exemplary embodiment of the programmable hardware shown in FIG. 1.

In one embodiment, the programmable hardware 170 may be a field programmable gate array (FPGA) 200 as illustrated in FIG. 2. FPGA 200 includes a configuration input 205 to receive a configuration pattern, such as a configuration bit stream. The configuration pattern is used to configure configurable elements 220. Configurable elements 220 may consist of series or arrays of logic gates, such as AND, OR, NAND, and NOR gates. Configurable elements may also be storage elements, such as flip flops.

Different configuration patterns may be used to configure FPGA 200 with a variety of different configurations. Data input 215 inputs data into a configuration of FPGA 200. Data is manipulated differently depending upon the configuration of the configurable elements. A data output 225 is coupled to the configurable elements and is used to output the manipulated data.

FPGA 200 also includes a non-reconfigurable memory 210. Non-reconfigurable memory 210 may be used to store an identification key used in the encryption process. FPGA 200 additionally includes a key generator 230 to generate the identification key and to initially configure non-reconfigurable memory 215 with the identification key. In other embodiments, FPGA 200 may not include the non-reconfigurable memory 210 or the key generator 210.

Figure 3:
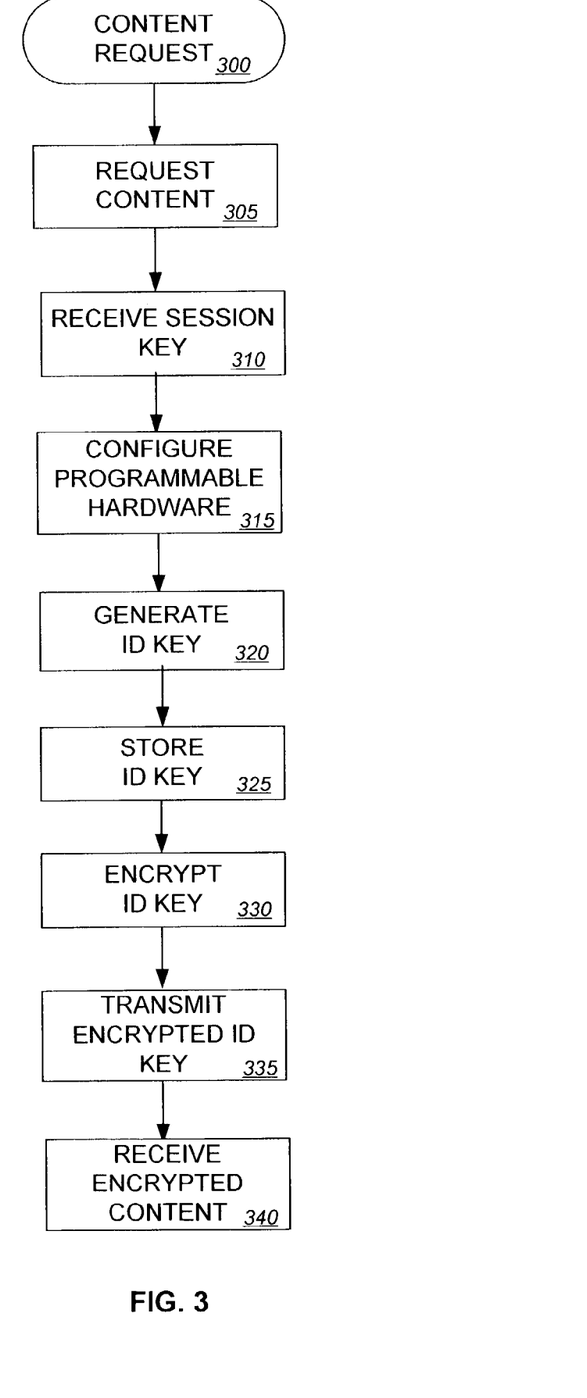
FIG. 3 is a flow diagram illustrating an exemplary method for receiving content that may be used by the content customer of FIG. 1.

FIG. 3 illustrates a method for receiving content 300 that may be used by a content customer. The method begins with transmitting a request for content 305 to a content provider. The request for content may be a request made by a client wanting to download content over the Internet, a request made by a computer or destination drive to copy data, a request made by a playback device accessing stored content, or other request for content.

Next, a session key is received 310 from the content provider in response to the content request. This session key can be a bit stream or other type of configuration pattern that is used to configure programmable hardware 170.

Programmable hardware 170 is then configured with a first configuration by using the session key 315. For example, the session key may be input into a configuration port of an FPGA and used to configure the FPGA. The resulting configuration of the programmable hardware is logic that will manipulate data according to an algorithm determined by the configuration.

About the same time, an identification key is generated 320. The identification key may be a random number generated by any type of random number generator well known in the art. It may be used as a unique identifier to limit copying or access of the requested content. In one embodiment, the programmable hardware 170 is an FPGA comprising a random number generator. The FPGA generates the identification key by interacting with a circuit external to the FPGA to seed the generator, such as an analog noise generator.

After the identification key is generated, it is stored 325 for future reference. The identification key may be stored in a restricted area that can only be accessed by the programmable hardware 170 used to obtain the content, or by similar programmable hardware. To ensure the area remains accessible only by programmable hardware, access requests to the restricted area may be monitored and all requests not initiated by programmable hardware may be blocked.

In one embodiment, the restricted area may be an area of the same storage medium that will store the content. This area may be inaccessible to users through normal interface commands. Storing the identification key on the same storage medium as the content may allow any device equipped with a programmable hardware 170 to access the content, but copies of the content that do not have the proper identification key stored in the restricted area may not be accessible. Alternately, the identification key may be stored in an area accessible only to this particular programmable hardware, such as a memory inside the programmable hardware. This may limit playback of the content to only the device or devices that have access to the programmable hardware used to obtain the content.

Programmable hardware is then used to encrypt the identification key 330. The identification key can be streamed through the programmable hardware to produce an encrypted key. The programmable hardware will encrypt the identification key with an algorithm determined by the first configuration of the programmable hardware.

Next, the encrypted identification key is transmitted to the content provider 335. Encrypted content is then received 340. The encrypted content contains the requested content and the identification key in encrypted form. As described elsewhere in this application, the identification key may be used to ensure that the content can only be decrypted by a customer having access to the identification key.

Other information may also be received along with the encrypted content. A content access key may be received to decrypt the encrypted content. If the content is transmitted with two levels of encryption, a transmission key may be received that can be used to decrypt the outer level of transmission. Other keys that may be used in later copying or sharing of the content by the customer may also be received.

Additionally, access rights of the content may be received along with encrypted content or exposed as part of decrypting the outer level of encryption. These access rights may include an expiration date for viewing or accessing the content, an allowed viewing time limiting the total amount of time the content may be viewed or accessed, and an allowed access count limiting the number of times the content may be accessed. These access rights may be written to a restricted area for later use. This area may be the same area used to store the identification key or it may be a different area.

Although FIG. 3 depicts an order to the method, it should be appreciated that alternate embodiments may use a different order. For example, the identification key may be generated 320 before configuring the programmable hardware 315. Additionally, the identification key may be stored 325 at any point after it is generated.

Figure 4:
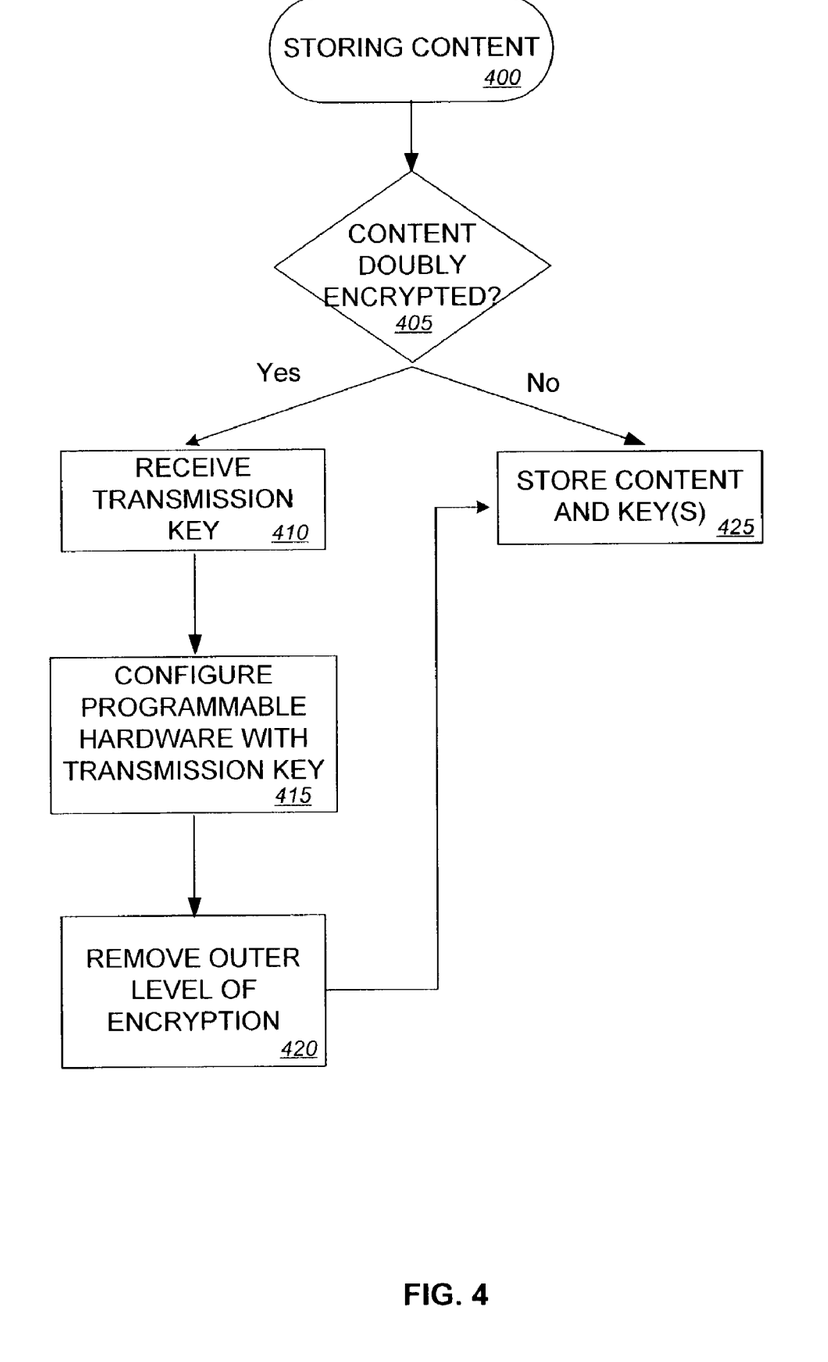
FIG. 4 is a flow diagram illustrating the storing of content that may have been received according to the method illustrated in FIG. 3.

In one embodiment, after the encrypted content is received it may be stored for later access or playback. FIG. 4 illustrates a method of storing content 400 after it has been received. The content may have been received with two levels of encryption for additional security. The outermost level of encryption may be used to encrypt the content and a content access key that provide access to the content. Other information, such as configuration keys to be used in later copying or access of the content from a second customer of the current content customer, may also have been encrypted with the outer level of encryption.

Before the content is stored, a determination is made as to whether the content is doubly encrypted 405. If the content is encrypted with a second level of encryption, a transmission key will have also been received 410 from the content provider to decrypt the outermost layer of encryption. The transmission key may have been received as a header to the encrypted content. By way of example, the transmission key can be a bit stream or other type of configuration pattern that is used to configure programmable hardware. Programmable hardware is configured with a second configuration by using the transmission key 415.

The second configuration of the programmable hardware is then used to decrypt the outer level of encryption 420. This may be done by streaming the encrypted content through the data input of the programmable hardware while it is configured with the second configuration. As part of this decryption process, a content access key to decrypt the final level of content and other information, such as access rights, may be exposed. If access rights are exposed, they may be written to a restricted area of the storage medium.

After the outer level of encryption has been removed, or it has been determined that the content is not doubly encrypted 405, the content encrypted with the final level of encryption is stored along with the content access key 425. If the content was not doubly encrypted, the content access key is also received from the content provider along with the encrypted content. Other keys that may be used by subsequent content customers may also be stored. The content may be stored on any type of storage medium, such as a disk, a CD, a tape, or a recordable DVD.

The encrypted content that is stored contains the identification key. By storing the content in encrypted form, access to the unencrypted content is limited to devices having access to the identification key matching the identification key contained in the encrypted content. As described elsewhere, this may only be the device or devices that have access to the programmable device used to obtain the content. If the identification key is also stored on the storage medium, access may be given to any device having access to a programmable device that can be used in the decryption process described in FIG. 7.

Figure 5:
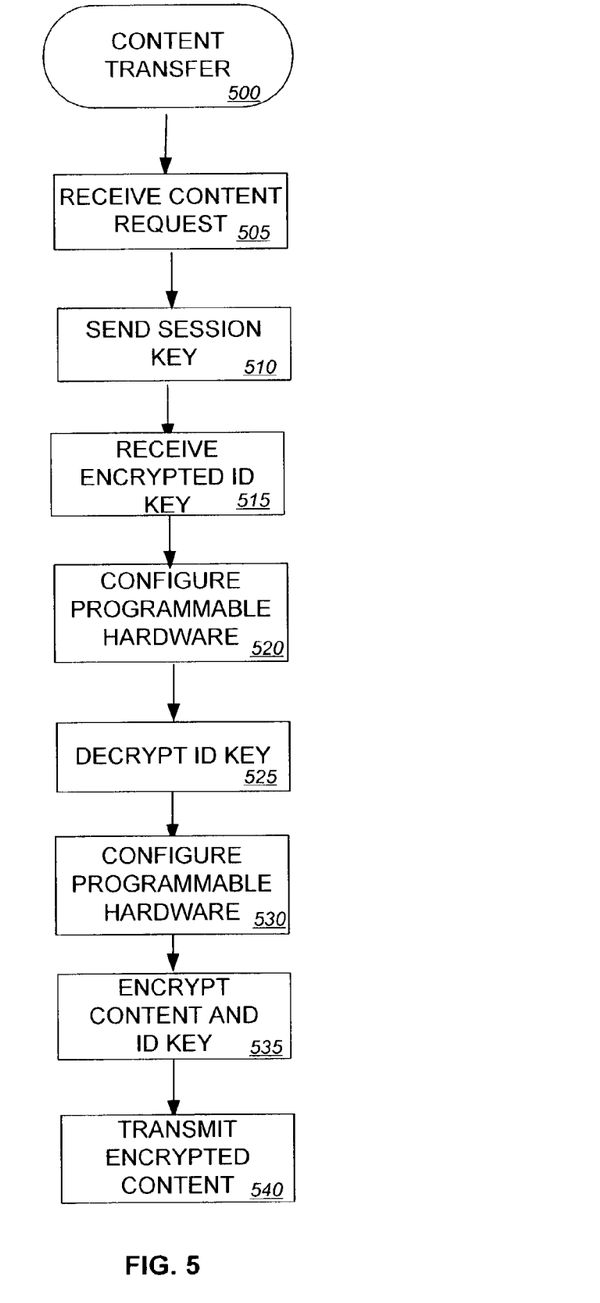
FIG. 5 illustrates an exemplary method for the transfer of encrypted content that may be used by the content provider of FIG. 1.

FIG. 5 is a flow diagram illustrating a content transfer process 500 that may be used by a content provider. After a request for content is received 505, a session key is sent to the content customer 510. The keys used by the content transfer process may be obtained from a key library or may be associated with the content to be transferred.

Next, an encrypted identification key is received 515 from the content customer in response to the session key. The identification key may have been encrypted by the content customer according to an algorithm determined by a programmable hardware configured with the session key.

The content provider has access to the key needed to configure its programmable hardware so that the programmable hardware is configured to decrypt the identification key. Accordingly, the content provider's programmable hardware is configured in a first configuration using the appropriate key 520. It should be appreciated that the logic inside the content customer's programmable hardware may be the same or different than the logic inside the content provider's programmable hardware. Thus, the key used to configure the provider's programmable hardware with the decryption algorithm may be the same as the session key sent to the content customer or it may be different.

After the programmable hardware is configured, the identification key is decrypted according to the decryption algorithm determined by the first configuration 525. The programmable hardware is then configured with a second configuration using another key 520. This second configuration of the programmable hardware is used to encrypt the content 535 requested by the customer.

In one embodiment, while the content is being encrypted, the programmable hardware may also insert the identification key into one or more locations of the content. Alternately, the identification key may be inserted into one or more locations of the content, or appended to the content, before the encryption process. The encrypted content containing the identification key is then transmitted to the content customer 540. A content access key that may be used to configure the customer's programmable hardware to decrypt the encrypted content is also transmitted. An intruder may not be able to intercept content transferred according to the process described above. As will be described further with reference to FIG. 7, in some embodiments the encrypted content may not be decrypted unless the user has access to the identification key contained in the content.

In alternate embodiments, other information may be encrypted with the content. For example, copy privilege information specifying the copy privileges of the content and the privileges of any authorized copies of the content may be appended to the content and encrypted along with the content. Keys that allow the content customer to act as a content provider may also be encrypted with the content. Alternately, information, such as the copy privilege information or keys, may be sent separately with the content.

Additionally, the encrypted content and other information, such as access rights, other configuration keys, and the content access key, may be encrypted with a second level of encryption. To perform this second level of encryption, a key is used to configure the programmable hardware with a third configuration. Next, the third configuration of the programmable hardware is used to encrypt the encrypted content and other information. The customer may then receive this doubly encrypted content instead of the first encrypted content. A transmission key that may be used to configure the customer's programmable hardware to remove the outer level of encryption may also be transmitted.

Figure 6:
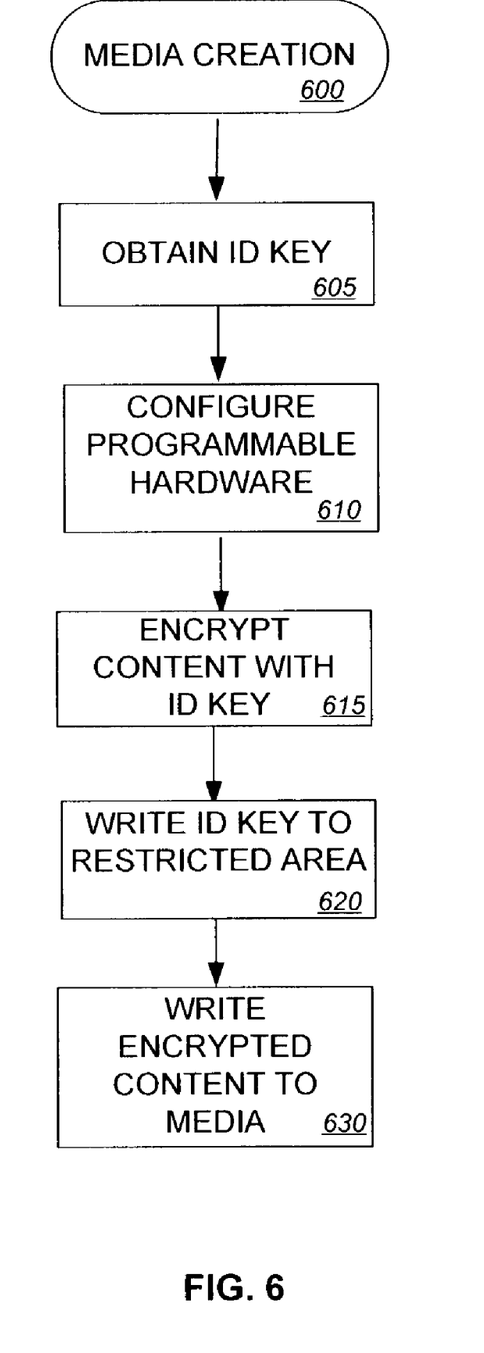
FIG. 6 shows a method for creating media with encrypted content according to one embodiment.

FIG. 6 illustrates a method for creating media for later distribution. This process may be used by a manufacturer of DVD movies or music CDs. It should be appreciated that alternate embodiments may use a different order than that depicted in FIG. 6.

First, an identification key to be used to uniquely identify this media is obtained 605. The identification key may be identical for all media containing the same content, or each media may have its own identification key. The identification key may be generated or it may be obtained from a key library or other location.

Next, programmable hardware is configured. The resulting configuration of the programmable hardware is logic that will manipulate data according to an algorithm determined by the configuration. This configuration of the programmable hardware is used to encrypt the media content 615.

As part of the encryption process 615, the programmable hardware may also insert the identification key into one or more locations of the content. Alternately, the identification key may be inserted into one or more locations of the content, or appended to the content, before the encryption process.

At about the same time, the identification key is written to a restricted area of the media 620. This area is an area that may be inaccessible by a user. In one embodiment, the restricted area may be an area accessible only by a programmable hardware.

The encrypted content containing the identification key is then written to the media 630. A content access key that is to be used to configure the customer's programmable hardware to decrypt the encrypted content may also be written to the media as a header to the content.

As with content received by a content customer, the media content created by this process can be accessed in a process similar to that described below with reference to FIG. 7. In one embodiment, if the media does not contain the identification key matching the identification key that was inserted into the content, the content will not be decrypted.

Thus, the embodiment described above may subvert illegal copying because the identification key written to the restricted area may not be copied during an unauthorized copying process.

Figure 7:
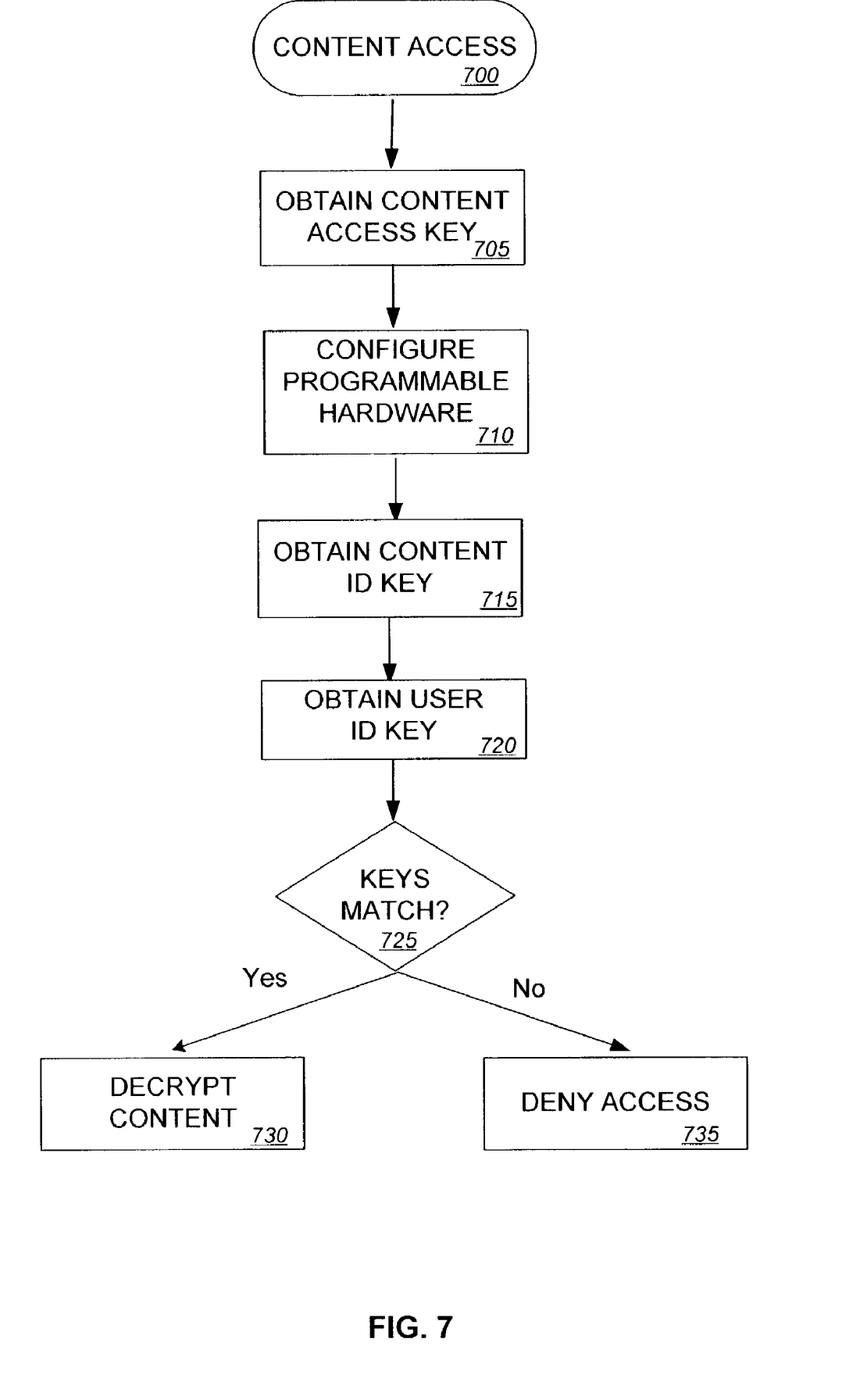
FIG. 7 is a flow diagram illustrating an exemplary process for accessing encrypted content.

FIG. 7 illustrates a method for accessing the encrypted content 700. The encrypted content may be accessed immediately after it is obtained or it may be accessed from a storage medium. According to one embodiment, the content may only be decrypted during an authorized copying as described in FIG. 8 or if the content is being played back or used. This provides for added protection of the content since the user never has access to the unencrypted content.

The method begins by obtaining a content access key 705 that will be used as a key to decrypt the content. This key may have been sent or stored as a header to the encrypted content. In one embodiment, the content access key is obtained by removing an outer level of encryption as described with reference to FIG. 4.

Next, a programmable hardware is configured using the content access key 710. The resulting configuration of the programmable hardware is logic that will manipulate data according to a decryption algorithm determined by the configuration.

A content identification key that is contained in the encrypted content is then obtained 715. This content identification key may be obtained by streaming a portion of the encrypted content through the configured programmable hardware until the content identification key is located. At about the same time, a user identification key is also obtained 720. The user identification key may be retrieved from a storage area of the programmable device, a restricted area on a storage medium, or other location.

Next, the content identification key is compared to the user identification key 725. If the keys do not match, the content is not decrypted and access to the content is disabled or denied 735. If the content identification key matches the user identification key, the content is decrypted 730 using the configured programmable hardware. This may be done by streaming the encrypted content through a data input of the programmable hardware. The streamed content is then decrypted according to a decryption algorithm determined by the configuration of the programmable hardware. In alternate embodiments, the decrypted content may then be streamed through a digital to analog converter coupled to the programmable hardware so that the unencrypted content is only available in analog format.

Figure 8:
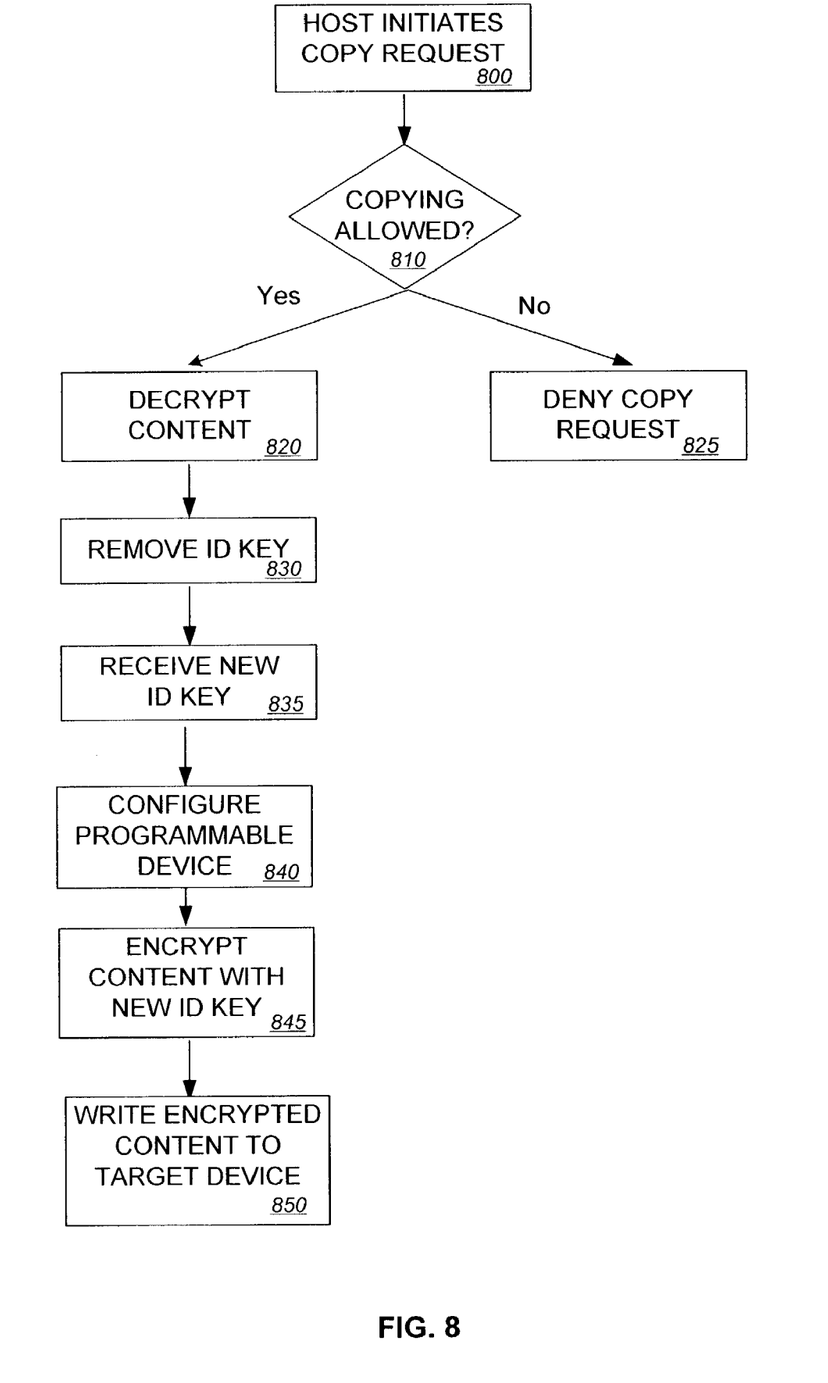
FIG. 8 is a flow diagram illustrating a process for copying encrypted content according to one embodiment.

FIG. 8 illustrates a method used to copy encrypted content. After a host initiates a copy request 800, a determination is made as to whether copying is allowed 810. A process that may be used to determine if copying is allowed is shown in FIG. 9.

Figure 9:
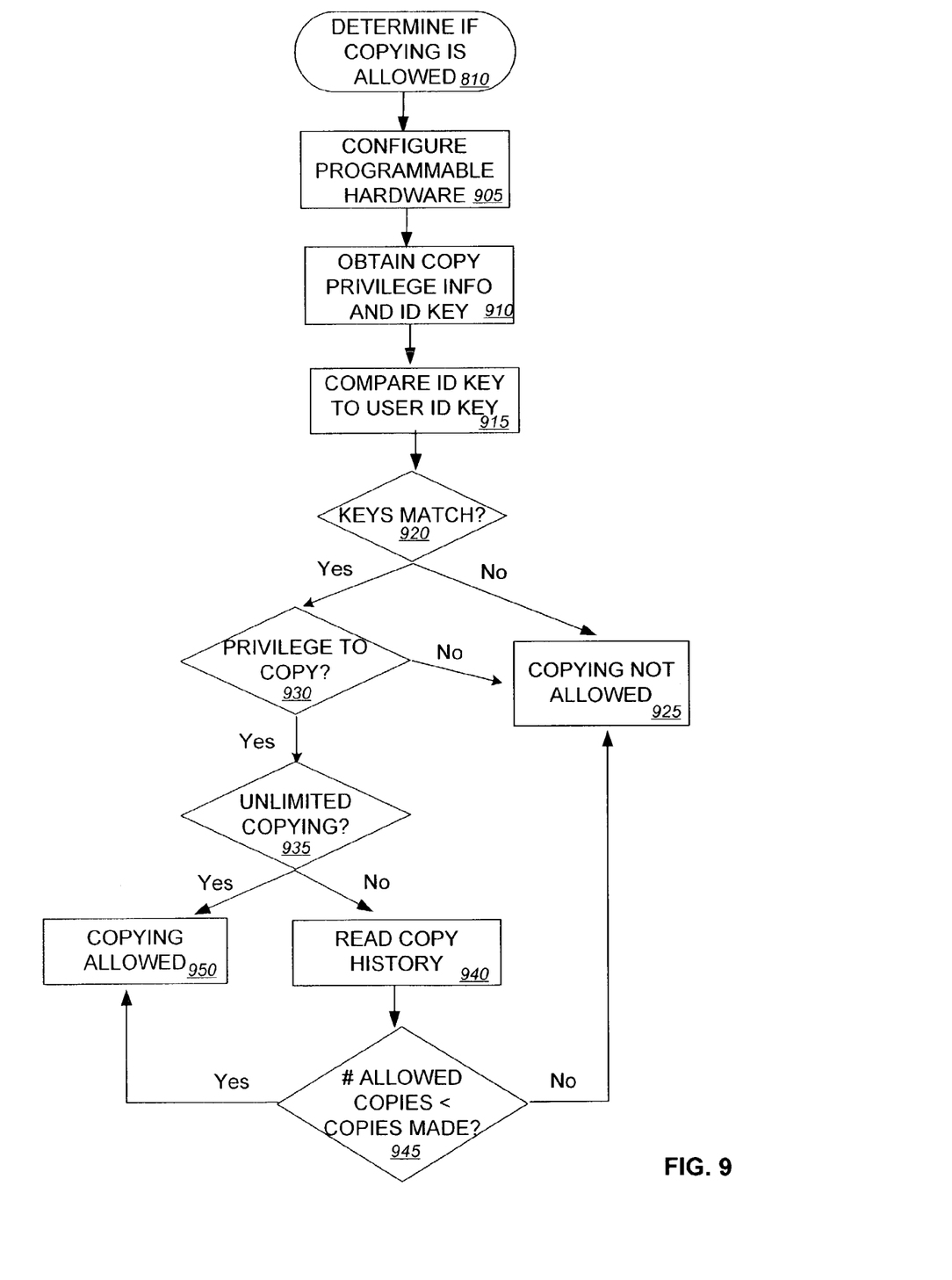
FIG. 9 shows an exemplary method for determining allowed copy rights that may be used in the copying process of FIG. 8.

Referring to FIG. 9, a programmable hardware is configured with a first configuration using a content access key 905. The programmable hardware may be associated with the source device or the target device for the copying. The content access key may have been obtained from a header on the encrypted content or another location. The resulting configuration of the programmable hardware is logic that will manipulate data according to a decryption algorithm determined by the configuration.

Using the first configuration of the programmable hardware, a content identification key and copy privilege information are obtained 910. The content identification key may be obtained by streaming a portion of the encrypted content through the configured hardware until the content identification key is located. The copy privilege information may be obtained in a similar manner or it may be obtained from a restricted area or another area on a storage medium. If the copy privilege information is encrypted, it may be decrypted by streaming it through the first configuration of the programmable hardware. Alternate embodiments may not include copy privilege information.

Next, the content identification key is compared to a user identification key 915. The user identification key may be obtained from a restricted area, such as an area on a storage medium inaccessible to users. If the keys do not match 920, a determination is made that copying is not allowed 925.

If the keys match, another check may be made to determine if the copy privileges allow copying 930. The copy privilege information that was obtained in 910 is read to determine what copy privileges are associated with the encrypted content. The copy privileges may grant unlimited copying rights, copying of only a set number of copies, or no copying at all. Other copy privilege information may also be included. For example, the copy privilege information may include copy privileges to be granted to an authorized copy. These privileges may be the same or different than the original content's copy privileges. It should be appreciated that in alternate embodiments that do not include copy privilege information, a determination may be made that copying is allowed if the keys match.

If the copy privileges do not allow copying, a determination is made that copying is not allowed 925. If the privileges allow unlimited copies 935, a determination is made that copying is allowed.

If the privileges allow only a set number of copies, a copy history is read 940. The copy history may be read from a restricted area on a storage medium or other location. The copy history may include a history of the number of copies made and the dates those copies were made. If the copy history is encrypted, it may be decrypted by streaming it through the first configuration of the programmable hardware.

In one embodiment, If the number of copies allowed by the copy privileges is less than the number of copies made 945, a determination is made that coping is allowed. Otherwise, the authorized number of copies have been made and no more copying is allowed 925. If a copy is allowed, the copy history may be updated at some point in the copying process to record the information associated with the making of the new copy.

Returning to FIG. 8, if a determination is made that copying is not allowed, the request to copy the data is denied 825. Otherwise, the content is decrypted 820. The content may be decrypted in a process similar to that described with reference to FIG. 7 and may be performed by a programmable device associated with the source device, such as a disk drive or recordable CD drive.

Either after the content is decrypted or as part of the decryption process, the content identification key associated with the content is removed 830. A new identification key to be used in the copy of the content is received 835. This new identification key may be generated by the target device and may be received in a process similar to that described in 510, 515, 520, and 525.

The programmable device is then configured with a second configuration 840 using a key that will configure the programmable hardware with an encryption algorithm. This key may be stored with the content, may be obtained from a key library, or may be obtained from another location. The second configuration of the programmable hardware is used to encrypt the content 845. The new identification key is appended to or inserted in one or more locations of the content, either before the content is encrypted, or as part of the encryption process. Copy privilege information associated with the copy may also be encrypted with the content. Alternately, the copy privilege information of the copy may be appended to the content in unencrypted form.

Next, the encrypted content is sent to the target device to be copied to the copy medium 850. A header containing the content access key and any other keys or information may be sent along with the encrypted content. Additionally, the content may be sent to the target device with a second level of encryption. A process similar to that described in FIG. 4 may be used by the target device to remove the outer level of encryption before writing the content to the medium. If the copy privilege information is not encrypted as part of the content, the target device may write the copy privilege information to a restricted area of the copy medium before, during, or after copying the encrypted content to the medium.

It should be appreciated that alternate embodiments may include variations to the copying process described above. For example, the original content may not be decrypted and the identification key may not be removed. Instead, the copy may use the same identification key as the original content. The original content identification key may then be transmitted to the target device to be written to a restricted area of the copy medium so the contents of the copy may be accessed. For purposes of security, the content identification key may be encrypted along with the encrypted content in a second level of encryption before being sent to the target device.

Figure 10:
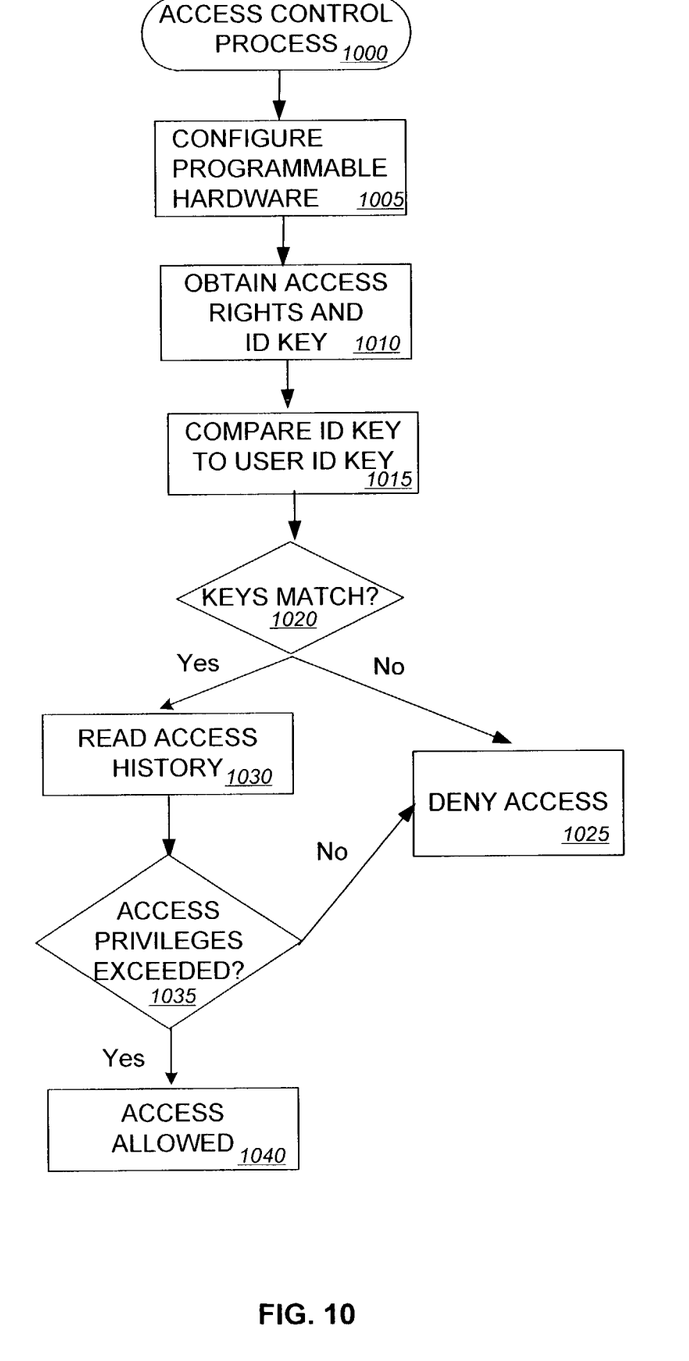
FIG. 10 illustrates an exemplary access control process.

FIG. 10 illustrates a process that may be used to control the access to content 1000. A programmable hardware associated with the device requesting access to the content is configured using a content access key 1005. The content access key may be stored as a header to the encrypted content or in another location.

Access rights and an identification key associated with the content are then obtained 1010. By way of example, the content identification key may be obtained by streaming a portion of the content through the programmable device. The access rights may be similarly obtained or may be read from a restricted area. If the access rights are stored in encrypted form on the restricted area, the programmable device may be used to decrypt the access rights. The access rights may include an allowed number of times the content can be accessed, an allowed period of time the content may be viewed or accessed, a total elapsed viewing time the content may be viewed, and/or an expiration date for accessing the content. Other access rights may also be included.

Next, the content identification key is compared to a user identification key 1015. The user identification key may be obtained from a restricted area, such as an area on a storage medium that is not accessible to users. If the keys to not match 1020, access to the content is denied 1025.

If the keys match 1020, an access history is read 1030. The access history may be read from a restricted area on the storage medium containing the content or other location. If the access history is encrypted, it may be decrypted by streaming it through the configured programmable hardware. In embodiments where the access rights consist of an expiration date, the access history may not be read or may be read after a determination is made that the expiration date has not yet been reached.

A determination is made if the access privileges have been exceeded 1035. In one embodiment, the access rights include a total number of authorized accesses. If the access history includes information that the content has been accessed less than the number of authorized accesses, access to the content is allowed 1040 as long as no other access privileges have been exceeded. If the access history information states the content has been accessed the authorized number of times, access to the content is denied 1025. A similar check is done if the access privileges consist of a total elapsed viewing time that a viewer may view the content.

In one embodiment, the access rights may consist of an expiration date in addition to or instead of other access rights. The expiration date may be an absolute date or may be a date relative to the date the content was obtained. In this embodiment, the expiration date may be compared to the date code associated with the device accessing the content. If the expiration date has passed, access to the content is denied 1025. For additional security, the date code may be generated by a non-volatile time-keeping circuit that may be part of the programmable hardware. If power is removed from the time-keeping circuit, the circuit may be reset in a state that renders all date-coded content inaccessible.

Access rights other than those described above are also contemplated. The determination on whether the access privileges have been exceeded may vary depending upon the access right to be analyzed. In some embodiments, if the access privileges have been exceeded, the content may be destroyed. This may be accomplished by overwriting some or all of the content. If access to the content is allowed, the access history may be updated to reflect the new access. Before updating the access history, the activity of the user may be monitored to determine a total elapsed viewing time the user viewed the content.

It should be appreciated that there are many ways that the access rights can be stored and obtained. In one embodiment, the access rights may be updatable. Additional security may be provided by encrypting the access rights with an access identification key. A process similar to the process described in FIG. 3 and FIG. 5 may be used to transmit and receive new or updated access rights. Updated access rights may be encrypted with a different access identification key than the originally received access rights. The new or updated access rights and the identification key associated with the access writes may be written to a restricted are on the same storage medium containing the content to be accessed.

What is claimed is:
1. A method comprising:
transmitting a content request to a content provider;
in response to the content request, receiving a session key;
configuring programmable hardware using the session key to produce a first configuration of the programmable hardware;
generating an identification key;
using the first configuration of the programmable hardware to encrypt the identification key;

transmitting the encrypted identification key to the content provider; and receiving encrypted content containing the identification key.

2. The method of claim 1, further comprising:

in response to the encrypted identification key, receiving from the content provider a transmission key associated with the encrypted content, the transmission key associated with a first layer of encryption of the encrypted content;

configuring the programmable hardware using the transmission key to produce a second configuration of the programmable hardware; and using the second configuration of the programmable hardware to remove the first layer of encryption from the encrypted content and expose a content access key, the content access key associated with a second layer of encryption of the encrypted content.

3. The method of claim 2, further comprising after removing the first layer of encryption, writing the encrypted content and the content access key to a storage medium.

4. The method of claim 3, wherein the storage medium comprises one of a disk, a compact disk (CD), a tape, and a recordable digital versatile disk (DVD).

5. The method of claim 2, further comprising:

configuring the programmable hardware using the content access key to produce a third configuration of the programmable hardware;

using the third configuration of the programmable hardware to remove the second layer of encryption from the encrypted content.

6. The method of claim 2, wherein the encrypted content comprises content embedded with the identification key and access rights.

7. The method of claim 6, further comprising exposing the access rights by using the second configuration of the programmable hardware.

8. The method of claim 7, further comprising writing the access rights to an area accessible only by the programmable hardware.

9. The method of claim 7, wherein the access rights comprise at least one of an expiration date, an allowed viewing time, and an allowed access count.

10. The method of claim 1, further comprising:

receiving from the content provider a content access key associated with the encrypted content;

configuring the programmable hardware using the content access key to produce a second configuration of the programmable hardware; and using the second configuration of the programmable hardware to decrypt the encrypted content.

11. The method of claim 10, wherein using the second configuration comprises:

using the second configuration to decrypt at least a portion of the encrypted content;

comparing a content identification key embedded in the content to the identification key;

determining the content identification key matches the identification key; and decrypting the encrypted content.

12. The method of claim 1, wherein the programmable hardware is a field programmable gate array (FPGA).

13. The method of claim 1, further comprising writing the identification key to a restricted area.

14. The method of claim 13. wherein the restricted area comprises an area of a storage medium inaccessible by a user.

15. The method of claim 13. wherein the restricted area comprises an area of the programmable hardware.

16. The method of claim 13, further comprising:

monitoring access requests to the restricted area;

blocking access requests not initiated by the programmable hardware.

17. The method of claim 1, wherein generating an identification key comprises generating a random number.

18. The method of claim 1, wherein all transmissions comprise transmissions over the World Wide Web.

19. A method comprising:

upon receiving a content request from a content customer, sending a session key to the content customer;

receiving an encrypted identification key in response to sending the session key;

configuring programmable hardware with a first configuration;

obtaining an identification key by using the first configuration of the programmable hardware to decrypt the encrypted identification key;

configuring the programmable hardware with a second configuration; and using the second configuration of the programmable hardware to generate first encrypted content containing the identification key from content associated with the content request.

20. The method of claim 19, wherein using the second configuration of the programmable hardware comprises using the second configuration of the programmable hardware to insert the identification key into at least one location in the content associated with the content request and to encrypt the content inserted with the identification key.

21. The method of claim 19, further comprising before using the second configuration, inserting the identification key into at least one location of the content associated with the content request.

22. The method of claim 19, further comprising transmitting the first encrypted content and a content access key to the content customer.

23. An apparatus comprising:

an identification key generator;

an interface to transmit a content request to a content provider, to receive a session key from the content provider in response to the content request, to transmit an encrypted identification key to the content provider, and to receive encrypted content containing the identification key from the content provider; and a programmable hardware communicatively coupled to the interface and the generator, the programmable hardware to be configured with a first configuration by using the session key and to encrypt the identification key while configured with the first configuration.

24. The apparatus of claim 23, wherein the programmable hardware is further to be configured with a second configuration by using a content access key and to decrypt the encrypted content while configured with the second configuration.

25. A field programmable gate array (FPGA) comprising:

a configuration input to receive a session key and a content access key;

a plurality of configurable elements coupled to the configuration input, the configurable elements to be configured with a first configuration by using the session key and to be configured with a second configuration by using the content access key;

a data input coupled to the configurable elements, the data input to input an identification key to the first configuration, and to input encrypted content to the second configuration; and an output coupled to the configurable elements to output an encrypted identification key from the identification key input to the first configuration and to output decrypted content from the encrypted content input to the second configuration.

26. The FPGA of claim 25, further comprising a non-reconfigurable area coupled to the configuration input to store the identification key.

27. An apparatus comprising:

an interface to receive a content request from a content customer, to transmit a session key to a content customer, to receive an encrypted identification key in response to the session key, and to transmit encrypted content and a content access key to the content customer;

a programmable hardware communicatively coupled to the interface, the programmable hardware to be configured with a first configuration, to obtain an identification key from the encrypted identification key while configured with the first configuration, to be configured with a second configuration, and to generate encrypted content containing the identification key from content associated with the content request while configured with the second configuration; and a content library communicatively coupled to the programmable hardware to store the content associated with the content request.

* * * * *

UNITED STATES PATENT AND TRADEMARK OFFICE
CERTIFICATE OF CORRECTION

| | | |
|---|---|---|
| PATENT NO. | : 7,440,574 B2 | Page 1 of 1 |
| APPLICATION NO. | : 10/460481 | |
| DATED | : October 21, 2008 | |
| INVENTOR(S) | : Darwin Mitchel Hanks et al. | |

It is certified that error appears in the above-identified patent and that said Letters Patent is hereby corrected as shown below:

In column 11, line 66, in Claim 14, delete "claim 13." and insert -- claim 13, --, therefor.

In column 12, line 1, in Claim 15, delete "claim 13." and insert -- claim 13, --, therefor.

Signed and Sealed this

Twenty-fourth Day of March, 2009

JOHN DOLL
*Acting Director of the United States Patent and Trademark Office*